United States Patent Office 2,748,181
Patented May 29, 1956

2,748,181

RUBBERY POLYMERS STABILIZED WITH METAL SALTS OF α,α-BIS(2-HYDROXY-3:5-DIALKYL-PHENYL) ALKANES

Harry Edward Jackson, Boris N. Leyland, and John Francis Wood, Blackley, Manchester, England, assignors to Imperial Chemical Industries Limited, a corporation of Great Britain No Drawing. Application July 3, 1952,
Serial No. 297,182

Claims priority, application Great Britain July 16, 1951

8 Claims. (Cl. 260—810)

This invention relates to a new process for preventing the deterioration by oxidation of natural and synthetic rubbers, both before and after vulcanisation.

According to this process, there is incorporated into the natural or synthetic rubber at any suitable stage before curing, a member of a new class of antioxidants, namely normal and basic aluminium, barium, calcium, magnesium, strontium and zinc salts of αα-bis-(2-hydroxy-3:5-dialkylphenyl) alkanes.

These salts are for the most part, themselves new chemical compounds. They may be made by the condensation of appropriate 2:4-dialkyl-phenols and saturated aliphatic aldehydes in the presence of acid condensing agents, followed by the conversion of the resulting αα-bis-(2-hydroxy-3:5-dialkylphenyl) alkanes to the normal and basic salts of the above mentioned metals. Some of the condensation products are known and the corresponding metal salts can be obtained from these known products.

We have found that these antioxidants not only have excellent preservative properties in rubber and produce little or no staining, but they have excellent physical properties also and are in many cases better adapted for use in the mechanical operations employed in rubber manufacture than are other non-staining antioxidants. They are well adapted for addition to latices of both natural and synthetic rubber.

As particular salts we mention those of the following compounds:

bis-(2-hydroxy-3:5-dimethylphenyl)methane
bis-(2-hydroxy-5-methyl-3-tert.-butylphenyl)methane
bis-(2-hydroxy-5-methyl-3-tert.-amylphenyl)methane
αα-bis-(2-hydroxy-3:5-dimethylphenyl)ethane
αα-bis-(2-hydroxy-3:5-dimethylphenyl)propane
αα-bis-(2-hydroxy-3:5-dimethylphenyl)butane
αα-bis-(2-hydroxy-3:5-dimethylphenyl)isobutane
αα-bis-(2-hydroxy-3:5-dimethylphenyl)heptane
αα-bis-(2-hydroxy-5-methyl-3-octylphenyl)butane
αα-bis-(2-hydroxy-5-methyl-3-tert.-butylphenyl)butane
αα-bis-(2-hydroxy-3:5-dioctylphenyl)butane
αα-bis-(2-hydroxy-3:5-dimethylphenyl)nonane
αα-bis-(2-hydroxy-3-methyl-5-ethylphenyl)nonane
αα-bis-(2-hydroxy-3:5-dimethylphenyl)octane
αα-bis-(2-hydroxy-3:5-dimethylphenyl)dodecane
αα-bis-(2-hydroxy-3:5-dimethylphenyl)αεε-trimethylhexane Salts of condensation products of aldehydes with mixed dialkylphenols at least one of which is a 2:4-dialkylphenol may also be employed, e. g. mixtures of such dialkylphenols obtainable from coal tar and especially mixtures containing large proportions of 2:4-dimethylphenol.

The following examples in which parts are by weight illustrate, but do not limit the invention:

EXAMPLE 1

A solution was made of 5 parts of anhydrous zinc chloride and 1 part of ammonium chloride in 50 parts of water and the solution heated to 70° C. Meanwhile, 9.9 parts of α:α-bis-(2-hydroxy-3:5-dimethylphenyl)butane (M. P. 124–125° C., made by reacting 2:4-dimethylphenol with n-butyraldehyde in the presence of hydrochloric acid) were dissolved in a solution of 2.8 parts of sodium hydroxide in 60 parts of water by heating to 70° C. These two solutions were then added simultaneously over about 5 minutes to 70 parts of water at 70° C. with very good agitation. Agitation was continued for a short time after mixing was completed and the white precipitate was then filtered off and washed with water until the filtrate was chloride free (no turbidity with silver nitrate solution acidified with nitric acid). The product was dried at 50° C. to constant weight. It was a white, free-flowing powder which did not melt below 250° C. and had a zinc content of 19.3%.

In a similar way there were obtained the zinc salts of α:α-bis-(2-hydroxy-3:5-dimethylphenyl)propane, α:α-bis-(2-hydroxy-3:5-dimethylphenyl)isobutane, and bis-(2-hydroxy-3-tert.butyl-5-methylphenyl)methane. In each case the requisite αα-bis-(2-hydroxy-3:5-dialkylphenyl)alkane was first obtained by condensing the appropriate phenol and aldehyde in the presence of hydrochloric acid as catalyst.

EXAMPLE 2

(a) *Preparation of phenol/aldehyde condensate*

61 parts of a phenolic fraction consisting essentially of a mixture of 2:4- and 2:5-dimethylphenols in the approximate proportions of 2:1 were charged to a reaction vessel, 11.3 parts of 35.4% hydrochloric acid added, the mixture stirred and cooled to below 20° C., then 20 parts of n-butyraldehyde run in over about 15 minutes keeping below 30° C. The mixture was then heated with stirring for 3 hours at 100–105° C., then washed with water (400 parts), secondly with 400 parts of water containing sufficient sodium carbonate in solution to bring the reaction mixture to pH 7, and finally with a further 400 parts of water. After separating the product from the aqueous phase as completely as possible, it was subjected to steam distillation in vacuo using steam at about 100° C. and heating to about 130° C. the pressure being reduced to 100 mm. of mercury; this was continued until 250 parts of distillate had collected in the receiver. The steam was then discontinued and the residue heated a further 15 minutes at 130° C. at 100 mm. pressure to dry it. The product was brown in colour (66 parts by weight) having a melting point (by the steel disc method) of 48° C.

(b) *Preparation of zinc salt*

A solution was made of 298 parts of the product made as above in 1500 parts of water containing 247 parts of 37.5% aqueous sodium hydroxide solution. This solution was heated to 75–80° C. A solution was also made up, and heated to 75–80° C. of 177 parts of anhydrous zinc chloride and 41 parts of ammonium chloride (to suppress hydrolysis of the zinc chloride) in 1500 parts of water. With good agitation, these two solutions were then added simultaneously to 1500 parts of water, keeping the zinc chloride solution slightly in advance of the other solution. After mixing agitation was continued for about 2 minutes, then allowed to settle and the granular solid washed several times with water until essentially free from chloride ions. It was then filtered, washed well with water on the nutsche and dried at 50° C. in an oven. The product was a light fawn powder of zinc content 19.3–19.5%.

EXAMPLE 3

Vulcanisable rubber compositions were made up by the conventional means according to the following formulae in which the parts are by weight:

| Mix | A | B | C | D | E | F |
|---|---|---|---|---|---|---|
| Pale crepe rubber | 100 | 100 | 100 | 100 | 100 | 100 |
| Zinc oxide | 10 | 10 | 10 | 10 | 10 | 10 |
| Blanc Fixe | 75 | 75 | 75 | 75 | 75 | 75 |
| Stearic acid | 1 | 1 | 1 | 1 | 1 | 1 |
| Titanium dioxide | 10 | 10 | 10 | 10 | 10 | 10 |
| Sulphur | 2.5 | 2.5 | 2.5 | 2.5 | 2.5 | 2.5 |
| 2-Mercaptobenzothiazole | 0.5 | 0.5 | 0.5 | 0.5 | 0.5 | 0.5 |
| Zinc salt of phenol/aldehyde condensate made as in Example 2 | | 1 | | | | |
| Zinc salt of $\alpha:\alpha$-bis-(2-hydroxy-3:5-di-methylphenyl) propane | | | 1 | | | |
| Zinc salt of $\alpha:\alpha$-bis-(2-hydroxy-3:5-di-methylphenyl) butane | | | | 1 | | |
| Zinc salt of $\alpha:\alpha$-bis-(2-hydroxy-3:5-di-methylphenyl) isobutane | | | | | 1 | |
| Zinc salt of bis-(2-hydroxy-3-tert. butyl-5-methylphenyl) methane | | | | | | 1 |

The mixes were vulcanised for 30 minutes at 141° C. Ring-shaped test pieces were cut in the usual way and tensile strengths determined on a Schopper tensile testing machine. Test pieces cut from the same stocks were aged for different periods in the Bierer-Davis oxygen bomb under 300 lb./sq. in. oxygen pressure at 70° C. Other test pieces were aged in the Geer oven at 100° C. The tensile strengths of all these test pieces were determined. The results obtained are given in the following table: the unaged figures are actual values obtained in kg./sq. cm. whilst the aged figures are calculated as percentage retained tensile strengths.

| Mix No. | A | B | C | D | E | F |
|---|---|---|---|---|---|---|
| Unaged | 174 | 159 | 159 | 164 | 169 | 175 |
| Aged 8 days in bomb | 79 | 86 | 86 | 82 | 85 | 91 |
| Aged 12 days in bomb | 55 | 72 | 69 | 71 | 72 | 77 |
| Aged 16 days in bomb | Perished | 62 | 65 | 57 | 66 | 76 |
| Aged 4 days in oven at 100° C | 13 | 29 | 37 | 35 | 49 | 40 |

EXAMPLE 4

Vulcanisable rubber compositions were made up by the conventional means according to the following formulae in which the parts are by weight:

| Mix | G | H |
|---|---|---|
| Pale crepe rubber | 100 | 100 |
| Zinc oxide | 10 | 10 |
| Blanc Fixe | 75 | 75 |
| Stearic acid | 1 | 1 |
| Sulphur | 3 | 3 |
| Diphenylguanidine | 0.5 | 0.5 |
| Zinc salt of phenol/aldehyde condensate made as in Example 2 | | 1 |

The mixes were vulcanised for 75 minutes at 141° C., then tested for tensile strength both aged and unaged as in Example 3. In addition test pieces were aged in the Geer oven at 70° C. The results obtained are given in the following table: the unaged figures are actual values obtained in kg./sq. cm. whilst the aged figures are calculated as percentage retained tensile strengths.

| Mix No. | G | H |
|---|---|---|
| Unaged | 204 | 204 |
| Aged 8 days in bomb | Perished | 36 |
| Aged 12 days in bomb | do | 22 |
| Aged 16 days in bomb | do | 23 |
| Aged 2 weeks in oven at 70° C | 59 | 71 |
| Aged 4 weeks in oven at 70° C | 28 | 46 |
| Aged 6 weeks in oven at 70° C | 12 | 19 |
| Aged 1 day in oven at 100° C | 63 | 70 |
| Aged 2 days in oven at 100° C | 25 | 27 |
| Aged 3 days in oven at 100° C | 6 | 9 |

EXAMPLE 5

Vulcanisable rubber compositions were made up by the conventional means according to the following formulae in which the parts are by weight:

| Mix | I | K |
|---|---|---|
| Pale crepe rubber | 100 | 100 |
| Zinc oxide | 10 | 10 |
| Blanc Fixe | 75 | 75 |
| Stearic acid | 1 | 1 |
| Titanium dioxide | 10 | 10 |
| Sulphur | 2 | 2 |
| Zinc diethyldithiocarbamate | 0.375 | 0.375 |
| Zinc salt of phenol/aldehyde condensate made as in Example 2 | | 1 |

The mixes were vulcanised for 12 minutes at 125° C., then tensile strengths of ring-shaped test pieces determined both before ageing and after ageing in the Bierer-Davis oxygen bomb and in the Geer oven. The results obtained are given in the following tables. Unaged tensile strengths are actual figures obtained in kg./sq. cm. whilst aged figures are given as percentage retained tensile strengths:

| Mix No. | I | K |
|---|---|---|
| Unaged | 209 | 195 |
| Aged 8 days in bomb | Perished | 85 |
| Aged 12 days in bomb | do | 63 |
| Aged 16 days in bomb | do | 51 |
| Aged 3 weeks in oven at 70° C | 48 | 72 |
| Aged 6 weeks in oven at 70° C | 22 | 42 |
| Aged 1 day in oven at 70° C | 53 | 66 |
| Aged 2 days in oven at 70° C | 32 | 46 |
| Aged 3 days in oven at 70° C | 21 | 36 |
| Aged 4 days in oven at 70° C | 12 | 27 |

EXAMPLE 6

A solution was made of 240 parts of the phenol/aldehyde condensate, made as in Example 2 (a) above, in 1200 parts of water containing 200 parts of 32% aqueous sodium hydroxide dissolved therein. A separate solution was made of 248 parts of magnesium sulphate crystals in 1200 parts of water. These two solutions were then simultaneously added, over 140 minutes at room temperature, to 1200 parts of water containing 14.6 parts of a 20% dispersion of paraffin wax using good agitation. The addition of the magnesium sulphate solution was maintained slightly in advance of the other solution. After mixing agitation was continued for a further 45 minutes then the solid filtered off, well washed and dried in an oven at 40° C. The product contained 7.2% magnesium.

Vulcanisable rubber compositions were made up by the conventional means according to the following formulae in which parts are by weight:

| Mix | L | M | N |
|---|---|---|---|
| Pale crepe rubber | 100 | 100 | 100 |
| Zinc oxide | 10 | 10 | 10 |
| Blanc Fixe | 75 | 75 | 75 |
| Stearic acid | 1 | 1 | 1 |
| Sulphur | 3 | 3 | 3 |
| Diphenylguanidine | 0.5 | 0.5 | 0.5 |
| Magnesium salt of phenol/aldehyde condensate made as above | | 1 | |
| Zinc salt of phenol/aldehyde condensate made as in Example 2 | | | 1 |

The mixes were vulcanised for 75 minutes at 141° C. and tested as in the previous examples with the following results (the unaged tensile figures are absolute in kg./sq. cm.; aged results are expressed as percentage retained tensile strengths):

| Mix No. | L | M | N |
|---|---|---|---|
| Unaged | 200 | 191 | 174 |
| Aged 4 days in oxygen bomb | Perished | 68 | 61 |
| Aged 8 days in oxygen bomb | ---do--- | 42 | 48 |
| Aged 12 days in oxygen bomb | ---do--- | 18 | 20 |
| Aged 2 weeks in oven at 70° C | 62 | 75 | 82 |
| Aged 4 weeks in oven at 70° C | 24 | 42 | 41 |
| Aged 6 weeks in oven at 70° C | 11 | 15 | 17 |

EXAMPLE 7

Vulcanisable rubber compositions were made up by the conventional means according to the following formulae in which the parts are by weight:

| Mix | O | P | Q |
|---|---|---|---|
| Pale crepe rubber | 100 | 100 | 100 |
| Zinc oxide | 10 | 10 | 10 |
| Blanc Fixe | 75 | 75 | 75 |
| Stearic acid | 1 | 1 | 1 |
| Titanium dioxide | 10 | 10 | 10 |
| Sulphur | 2.5 | 2.5 | 2.5 |
| 2-Mercaptobenzothiazole | 0.5 | 0.5 | 0.5 |
| Magnesium salt of phenol/aldehyde condensate made as in Example 6 | | 1 | |
| Zinc salt of phenol/aldehyde condensate made as in Example 2 | | | 1 |

The mixes were vulcanised for 30 minutes at 141° C., and tested as in the previous examples with the following results (the unaged tensile figures are absolute in kg./sq. cm.; aged tensiles are expressed as percentage retained tensile). In addition discs of the vulcanisates were tested for staining properties by exposure under an ultraviolet lamp for 24 hours, and by outdoor exposure for periods of 4 and 6 weeks; the results of these tests are also given below:

| Mix No. | O | P | Q |
|---|---|---|---|
| Unaged | 165 | 155 | 165 |
| Aged 4 days in oxygen bomb | 79 | 88 | 72 |
| Aged 8 days in oxygen bomb | 62 | 78 | 69 |
| Aged 12 days in oxygen bomb | 27 | 59 | 55 |
| Aged 20 days in oxygen bomb | Perished | 42 | 33 |
| Aged 3 weeks in oven at 70° C | 87 | 100 | 84 |
| Aged 6 weeks in oven at 70° C | 73 | 86 | 81 |
| Aged 1 day in oven at 100° C | 67 | 94 | 96 |
| Aged 2 days in oven at 100° C | 57 | 84 | 83 |
| Aged 3 days in oven at 100° C | 18 | 45 | 65 |
| Aged 4 days in oven at 100° C | 5 | 9 | 16 |
| Colour after 24 hrs.' exposure to ultraviolet lamp | Lt. brown | Lt. brown | Lt. brown |
| Colour after 4 weeks' outdoor exposure | cream | cream | very pale fawn |
| Colour after 6 weeks' outdoor exposure | pale fawn | pale fawn | pale fawn |

EXAMPLE 8

Vulcanisable rubber compositions were made up by the conventional means according to the following formulae in which the parts are by weight:

| Mix | R | S | T |
|---|---|---|---|
| Pale crepe rubber | 100 | 100 | 100 |
| Zinc oxide | 10 | 10 | 10 |
| Blanc Fixe | 75 | 75 | 75 |
| Stearic acid | 1 | 1 | 1 |
| Titanium dioxide | 10 | 10 | 10 |
| Sulphur | 2 | 2 | 2 |
| Tetramethylthiuram monosulphide | 0.375 | 0.375 | 0.375 |
| Magnesium salt made as in Example 6 | | 1 | |
| Zinc salt made as in Example 2 | | | 1 |

The mixes were vulcanised for 10 minutes at 141° C. and tested as previously with the following results (expressed as before). Staining was also examined by the exposure to an ultraviolet lamp and outdoors.

| Mix No. | R | S | T |
|---|---|---|---|
| Unaged | 182 | 165 | 175 |
| Aged 4 days in oxygen bomb | 66 | 87 | 80 |
| Aged 8 days in oxygen bomb | Perished | 56 | 59 |
| Aged 12 days in oxygen bomb | ---do--- | 33 | |
| Aged 16 days in oxygen bomb | ---do--- | 32 | 32 |
| Aged 2 weeks in oven at 70° C | 41 | 57 | 41 |
| Aged 4 weeks in oven at 70° C | 20 | 41 | |
| Aged 6 weeks in oven at 70° C | 13 | 23 | 26 |
| Aged 1 day in oven at 100° C | 49 | 53 | 65 |
| Aged 2 days in oven at 100° C | 29 | 35 | 42 |
| Colour after 24 hrs.' exposure to ultraviolet lamp | pale cream | cream | cream |
| Colour after 6 weeks' exposure to outdoors | (¹) | (²) | (³) |

¹ Very pale cream (fine crazing of surface).
² Extremely pale cream (a little whiter than R) (no crazing of surface).
³ Very pale cream (very fine crazing of surface; better than R).

EXAMPLE 9

Vulcanisable rubber compositions were made up by the conventional means according to the following formulae in which the parts are by weight:

| Mix | V | W | X |
|---|---|---|---|
| Pale crepe rubber | 100 | 100 | 100 |
| Zinc oxide | 10 | 10 | 10 |
| Blanc Fixe | 75 | 75 | 75 |
| Stearic acid | 1 | 1 | 1 |
| Titanium dioxide | 10 | 10 | 10 |
| Sulphur | 2 | 2 | 2 |
| Zinc diethyldithiocarbamate | 0.375 | 0.375 | 0.375 |
| Magnesium salt made as in Example 6 | | 1 | |
| Zinc salt made as in Example 2 | | | 1 |

The mixes were vulcanised for 12 minutes at 125° C. and tested as previously (results expressed as before). Staining was also examined by exposure to an ultraviolet lamp and outdoors:

| Mix No. | V | W | X |
|---|---|---|---|
| Unaged | 186 | 179 | 190 |
| Aged 4 days in oxygen bomb | 88 | 99 | 89 |
| Aged 8 days in oxygen bomb | Perished | 81 | 80 |
| Aged 12 days in oxygen bomb | ---do--- | 55 | 56 |
| Aged 16 days in oxygen bomb | ---do--- | 33 | 33 |
| Aged 2 weeks in oven at 70° C | 45 | 73 | 61 |
| Aged 4 weeks in oven at 70° C | 21 | 39 | 40 |
| Aged 6 weeks in oven at 70° C | 11 | 22 | 17 |
| Colour after 24 hrs.' exposure to ultraviolet lamp | pale fawn | pale fawn | pale fawn |
| Colour after 6 weeks' exposure outdoors | (¹) | (²) | (³) |

¹ Pale cream (slight crazing of surface).
² Cream (very fine crazing of surface).
³ Cream (virtually no crazing of surface).

EXAMPLE 10

A solution was made of 25.6 parts of α:α-bis-(2-hydroxy-3:5-dimethylphenyl)methane (M. P. 144–146° C.) made by reacting 2:4-dimethylphenol with paraform in the presence of hydrochloric acid) in 100 parts of water containing 8 parts of sodium hydroxide. This solution was heated to 60–70° C. A solution was also made up and heated to 60–70° C. of 20.3 parts of magnesium chloride, $MgCl_2.6H_2O$ in 50 parts of water. With good agitation these two solutions were then added simultaneously to 25 parts of water at 60–70° C. keeping the magnesium chloride solution slightly in advance of the other solution. After mixing, agitation was continued for 5 minutes and the batch was then filtered. After washing with water until essentially free from chloride ions the filter cake was dried by heating at 90° C. under a pressure of 20 mm. of mercury. The product was a pale cream powder.

EXAMPLE 11

The calcium salt of bis-(2-hydroxy-3:5-dimethylphenyl)-methane was made as described for the magnesium salt in Example 10 but using 15.9 parts of anhydrous calcium acetate in place of the magnesium chloride. The product was a cream powder.

EXAMPLE 12

A solution was made of 10 parts of αα-bis-(2-hydroxy-3:5-dimethylphenyl)butane in 100 parts of water containing 2.8 parts of sodium hydroxide. This solution was heated to 70–75° C. A solution was also made up and heated to 70–75° C. of 4.8 parts of anhydrous magnesium sulphate in 50 parts of water. With good agitation these two solutions were then added simultaneously to 50 parts of water at 70–75° C., keeping the magnesium sulphate solution slightly in advance of the other solution. After mixing, agitation was continued for 5 minutes and the batch was then filtered. After washing with water until essentially free from sulphate ions, the filter cake was dried at 50° C. in an oven. The product was a pale cream powder of magnesium content 7.4%.

EXAMPLE 13

A solution was made of 15 parts of αα-bis-(2-hydroxy-3:5-dimethylphenyl)butane in 90 parts of water containing 12.5 parts of 32% aqueous sodium hydroxide solution. This solution was heated to 70° C. A solution was also made up and heated to 70° C. of 10.6 parts of calcium acetate, Ca(C$_2$H$_3$O$_2$)$_2$.H$_2$O, in 38 parts of water. With good agitation these two solutions were then added simultaneously to 25 parts of water at 70° C. Agitation was continued for a short time after mixing was completed and the precipitate was then filtered off, washed with water and dried at 50° C. to constant weight. The product was a light cream powder.

EXAMPLE 14

Using 20.2 parts of aluminium sulphate

Al$_2$(SO$_4$)$_3$.9H$_2$O in place of the calcium acetate in Example 13 gave the aluminium salt of αα-bis-(2-hydroxy-3:5-dimethylphenyl)-butane as a pale cream powder.

EXAMPLE 15

A solution of 7.5 parts of αα-bis-(2-hydroxy-3:5-dimethylphenyl)butane in a mixture of 35 parts of toluene and 16 parts of ethanol was boiled under reflux with a solution of 6.65 parts of strontium hydroxide Sr(OH)$_2$.8H$_2$O in 100 parts of water with rapid stirring for 3 hours. After filtration, the water, ethanol and toluene were removed by distillation and the residue dried to constant weight at 50° C. The product was a fawn powder.

EXAMPLE 16

Substitution of 8 parts of barium hydroxide

Ba(OH)$_2$.8H$_2$O for the strontium hydroxide in Example 15 gives the barium salt of αα-bis-(2-hydroxy-3:5-dimethylphenyl)butane as a light fawn powder.

EXAMPLE 17

A mixture of 184 parts of 2-t-amyl-4-methylphenol, B. P. 116–120°/13 mm. prepared by the reaction of 2-methyl-1-butene with p-cresol in the presence of concentrated sulphuric acid, with 20.25 parts of 37% formalin, 19 parts of hydrochloric acid (SG 1.18) and 64 parts of ethanol were boiled under reflux for 4 hours. A solution of 15 parts of sodium carbonate in 150 parts of water was added and the mixture boiled under reflux for ½ hour. The mixture was cooled, 500 parts of water were added and the oil was extracted with ether. The ethereal solution was washed alkali free with water and dried over sodium sulphate. The ether was distilled off and the residue crystallised from aqueous acetic acid giving bis-(2-hydroxy-3-t-amyl-5-methylphenyl)methane as colourless needles M. P. 92–93° C.

A solution was made of 15 parts of bis-(2-hydroxy-3-t-amyl-5-methylphenyl)methane, prepared as described above, in a mixture of 40 parts of water and 32 parts of methanol. This solution was heated to 60–70° C. A solution was also made up and heated to 60–70° C. of 9.1 parts of magnesium chloride, MgCl$_2$.6H$_2$O, in 20 parts of water and 16 parts of methanol. With good agitation these two solutions were added simultaneously to a mixture of 15 parts of water and 12 parts of methanol at 60–70° C. keeping the magnesium chloride solution slightly in advance of the other solution. Agitation was continued for 5 minutes and the batch then filtered. The filter cake was washed with 45% aqueous methanol until the washings were substantially free from chloride ion and dried in an oven at 50° C. to constant weight. The product was a pale cream powder.

In a similar way there were obtained the magnesium salts of bis-(2-hydroxy-5-methyl-3-t-butylphenyl)methane, αα-bis-(2-h y d r o x y-3:5-dimethylphenyl)dodecane and αα-bis-(2-hydroxy - 3:5 - dimethylphenyl)γεε-trimethylhexane.

EXAMPLE 18

Vulcanisable rubber compositions were made up by the conventional means according to the following formulae in which parts are by weight:

| Mix | a | b | c |
| --- | --- | --- | --- |
| Pale crepe rubber | 100 | 100 | 100 |
| Zinc oxide | 10 | 10 | 10 |
| Blanc fixe | 75 | 75 | 75 |
| Stearic acid | 1 | 1 | 1 |
| Titanium dioxide | 10 | 10 | 10 |
| Sulphur | 2 | 2 | 2 |
| Zinc diethyldithiocarbamate | 0.375 | 0.375 | 0.375 |
| Magnesium salt of bis-(2-hydroxy-3:5-dimethylphenyl)methane | | 1 | |
| Calcium salt of bis-(2-hydroxy-3:5-dimethylphenyl)methane | | | 1 |

The mixes were vulcanised for 12 minutes at 125° C. and tensile strength of ring-shaped test pieces determined before and after ageing in the Bierer-Davies oxygen bomb and the Geer oven. Discs of the vulcanisates were tested for staining properties by exposure under an ultraviolet lamp for 8 and 16 hours. The results are given in the following table:

| Mix | a | b | c |
| --- | --- | --- | --- |
| Unaged tensile strength (kg./sq. cm.) | 214 | 176 | 186. |
| Aged 8 days in bomb at 70° C | Perished | 153 | 153. |
| Aged 12 days in bomb at 70° C | do | 150 | 144. |
| Aged 16 days in bomb at 70° C | do | 116 | 106. |
| Colour after 8 hours' exposure to ultraviolet lamp | Cream | Cream | Cream. |
| Colour after 16 hours' exposure to ultraviolet lamp | do | do | Do. |

EXAMPLE 19

Vulcanisable rubber compositions were made up by the conventional means according to the following formulae in which parts are by weight:

| Mix | d | e | f |
| --- | --- | --- | --- |
| Pale crepe rubber | 100 | 100 | 100 |
| Zinc oxide | 10 | 10 | 10 |
| Blanc fixe | 75 | 75 | 75 |
| Stearic acid | 1 | 1 | 1 |
| Sulphur | 3 | 3 | 3 |
| Diphenylguanidine | 0.5 | 0.5 | 0.5 |
| Magnesium salt of bis-(2-hydroxy-3:5-dimethylphenyl) methane | | 1 | |
| Calcium salt of bis-(2-hydroxy-3:5-dimethylphenly)methane | | | 1 |

The mixes were vulcanised for 75 minutes at 141° C.

and aged as in the previous example with the following result (the figures are tensile strengths in kg./sq. cm.).

| Mix | d | e | f |
|---|---|---|---|
| Unaged | 206 | 179 | 185 |
| Aged 8 days in bomb at 70° C | Perished | 111 | 110 |
| Aged 2 weeks in oven at 70° C | 89 | 98 | 98 |

EXAMPLE 20

Vulcanisable rubber compositions were made up by the conventional means according to the following formulae in which parts are by weight:

| Mix | g | h | i | k | l | m |
|---|---|---|---|---|---|---|
| Pale crepe rubber | 100 | 100 | 100 | 100 | 100 | 100 |
| Zinc oxide | 10 | 10 | 10 | 10 | 10 | 10 |
| Blanc fixe | 75 | 75 | 75 | 75 | 75 | 75 |
| Stearic acid | 1 | 1 | 1 | 1 | 1 | 1 |
| Titanium dioxide | 10 | 10 | 10 | 10 | 10 | 10 |
| Sulphur | 2 | 2 | 2 | 2 | 2 | 2 |
| Zinc diethyldithiocarbamate | 0.375 | 0.375 | 0.375 | 0.375 | 0.375 | 0.375 |
| Magnesium salt of αα-bis-(2-hydroxy-3:5-dimethylphenyl)butane | | 1 | | | | |
| Calcium salt of αα-bis-(2-hydroxy-3:5-dimethylphenyl)butane | | | 1 | | | |
| Strontium salt of αα-bis-(2-hydroxy-3:5-dimethylphenyl)butane | | | | 1 | | |
| Barium salt of αα-bis-(2-hydroxy-3:5-dimethylphenyl)butane | | | | | 1 | |
| Aluminium salt of αα-bis-(2-hydroxy-3:5-dimethylphenyl)butane | | | | | | 1 |

The mixes were vulcanised for 12 minutes at 125° C. and tested as in the previous examples with the following results (the figures are tensile strengths in kg./sq. cm.):

| Mix | g | h | i | k | l | m |
|---|---|---|---|---|---|---|
| Unaged | 212 | 162 | 171 | 151 | 167 | 176 |
| Aged 12 days bomb at 70° C | Perished | 135 | 145 | 117 | 117 | 132 |
| Aged 16 days bomb at 70° C | do | 107 | 131 | | 90 | |
| Aged 3 weeks oven at 70° C | 100 | 116 | 108 | 116 | 118 | 102 |
| Aged 6 weeks oven at 70° C | 53 | 74 | 76 | | 70 | 65 |
| Aged 32 hours oven at 100° C | 72 | 98 | 103 | | 81 | |
| Colour after 24 hours' exposure to ultraviolet lamp | Cream | Cream | Cream | Cream | Cream | Cream |

EXAMPLE 21

Vulcanisable rubber compositions were made up by the conventional means according to the following formulae in which parts are by weight:

| Mix | n | o | p | q | r |
|---|---|---|---|---|---|
| Pale crepe rubber | 100 | 100 | 100 | 100 | 100 |
| Zinc oxide | 10 | 10 | 10 | 10 | 10 |
| Blanc fixe | 75 | 75 | 75 | 75 | 75 |
| Stearic acid | 1 | 1 | 1 | 1 | 1 |
| Sulphur | 3 | 3 | 3 | 3 | 3 |
| Diphenylguanidine | 0.5 | 0.5 | 0.5 | 0.5 | 0.5 |
| Magnesium salt of αα-bis-(2-hydroxy-3:5-dimethylphenyl) butane | | 1 | | | |
| Calcium salt of αα-bis-(2-hydroxy-3:5-dimethylphenyl) butane | | | 1 | | |
| Strontium salt of αα-bis-(2-hydroxy-3:5-dimethyl-phenyl) butane | | | | 1 | |
| Barium salt of αα-bis-(2-hydroxy-3:5-dimethylphenyl) butane | | | | | 1 |
| Aluminium salt of αα-bis-(2-hydroxy-3:5-dimethylphenyl) butane | | | | | |

The mixes were vulcanised for 75 minutes at 141° C. and tested as in the previous examples with the following results (the figures are tensile strengths in kg./sq. cm.):

| Mix | n | o | p | q | r |
|---|---|---|---|---|---|
| Unaged | 190 | 198 | 183 | 192 | 173 |
| Aged 8 days bomb at 70° C | Perished | 88 | 97 | 64 | 75 |
| Aged 12 days bomb at 70° C | do | 49 | 55 | 25 | 28 |
| Aged 2 weeks oven at 70° C | 135 | 146 | 161 | 146 | 153 |

EXAMPLE 22

Vulcanisable rubber compositions were made up by the conventional means according to the following formulae in which parts are by weight:

| Mix | s | t | u | v | w |
|---|---|---|---|---|---|
| Pale crepe rubber | 100 | 100 | 100 | 100 | 100 |
| Zinc oxide | 10 | 10 | 10 | 10 | 10 |
| Blanc fixe | 75 | 75 | 75 | 75 | 75 |
| Stearic acid | 1 | 1 | 1 | 1 | 1 |
| Titanium dioxide | 10 | 10 | 10 | 10 | 10 |
| Sulphur | 2 | 2 | 2 | 2 | 2 |
| Zinc diethyldithiocarbamate | 0.375 | 0.375 | 0.375 | 0.375 | 0.375 |
| Magnesium salt of bis-(2-hydroxy-3-t-butyl-5-methylphenyl)methane | | 1 | | | |
| Magnesium salt of bis-(2-hydroxy-3-t-amyl-5-methylphenyl)methane | | | 1 | | |
| Magnesium salt of αα-bis-(2-hydroxy-3:5-dimethylphenyl)dodecane | | | | 1 | |
| Magnesium salt of αα-bis-(2-hydroxy-3:5-dimethylphenyl)-γεε-trimethylhexane | | | | | 1 |

The mixes were vulcanised for 12 minutes at 125° C. and tested as in the previous examples with the following results (the figures are tensile strengths in kg./sq. cm.):

| Mix | s | t | u | v | w |
|---|---|---|---|---|---|
| Unaged | 197 | 180 | 177 | 174 | 170 |
| Aged 12 days bomb at 70° C | Perished | 163 | 154 | 113 | 125 |
| Aged 16 days bomb at 70° C | do | 144 | 125 | 88 | 103 |
| Aged 3 weeks oven at 70° C | 62 | 87 | 88 | 80 | 91 |
| Aged 6 weeks oven at 70° C | 29 | 70 | 64 | 51 | 59 |
| Aged 32 hours oven at 100° C | 71 | 97 | 88 | 79 | 98 |
| Colour after 24 hours' exposure to ultraviolet lamp | Cream | Cream | Cream | Cream | Cream |

EXAMPLE 23

Vulcanisable rubber compositions were made up by the conventional means according to the following formulae in which parts are by weight:

| Mix | x | y | z |
|---|---|---|---|
| Pale crepe rubber | 100 | 100 | 100 |
| Zinc oxide | 10 | 10 | 10 |
| Blanc fixe | 75 | 75 | 75 |
| Stearic acid | 1 | 1 | 1 |
| Sulphur | 3 | 3 | 3 |
| Diphenylguanidine | 0.5 | 0.5 | 0.5 |
| Magnesium salt of bis-(2-hydroxy-3-t-butyl-5-methylphenyl)methane | | 1 | |
| Magnesium salt of bis-(2-hydroxy-3-t-amyl-5-methylphenyl)methane | | | 1 |

The mixes were vulcanised for 75 minutes at 141° C. and tested as in the previous examples with the following results (the figures are tensile strengths in kg./sq. cm.):

| Mix | x | y | z |
|---|---|---|---|
| Unaged | 189 | 189 | 187 |
| Aged 8 days bomb at 70° C | Perished | 135 | 118 |
| Aged 12 days bomb at 70° C | do | 127 | 123 |
| Aged 16 days bomb at 70° C | do | 84 | 79 |
| Aged 2 weeks oven at 70° C | 116 | 186 | 176 |
| Aged 4 weeks oven at 70° C | 70 | 131 | 121 |
| Aged 32 hours oven at 100° C | 117 | 142 | 119 |

EXAMPLE 24

1 part by weight of the magnesium salt of phenolaldehyde condensate made as in Example 6 was incorporated by the conventional means into 100 parts by weight of gutta percha. Samples with, and without antioxidant were exposed to outdoor ageing and time in days noted for them to reach embrittlement:

Days
Gutta percha containing no antioxidant _____ 1
Gutta percha containing 1% of above antioxidant ___ 9

EXAMPLE 25

Vulcanisable neoprene compositions were made up by the conventional means according to the following formulae, in which parts are by weight:

| Mix Nos | I | II |
|---|---|---|
| Neoprene | 100 | 100 |
| Light calcined magnesium | 4 | 4 |
| Stearic acid | 0.5 | 0.5 |
| China clay | 25 | 25 |
| Whiting | 25 | 25 |
| Petroleum jelly | 2 | 2 |
| Pale cumar resin | 8 | 8 |
| Titanium dioxide | 15 | 15 |
| Zinc oxide | 5 | 5 |
| Magnesium salt of phenolaldehyde condensate made as in Example 6 | | 2 |

The mixes were vulcanised for 30 minutes at 152° C. and tested as in the previous examples with the following results (the unaged tensile figures as well as the results after ageing are expressed in kg./sq. cm.):

| Mix Nos | I | II |
|---|---|---|
| Unaged | 125 | 125 |
| Aged 4 days in oxygen bomb | 34 | 99 |
| Aged 8 days in oxygen bomb | 24 | 85 |
| Aged 6 months out of doors | 87 | 95 |
| Aged 1 year out of doors | 78 | 94 |
| Aged 2 years out of doors | 49 | 80 |

What we claim is:
1. A process for preventing the deterioration by oxidation of a rubber selected from the group consisting of natural and synthetic rubbers obtained by polymerizing a di-olefinic compound before and after vulcanization which comprises incorporating into said rubber prior to curing a material selected from the group consisting of normal and basic aluminum, barium, calcium, magnesium, strontium and zinc salts of $\alpha\alpha$-bis-(2-hydroxy-3:5-dialkyl-phenyl) alkanes.

2. A process as recited in claim 1 in which the magnesium salt of an $\alpha\alpha$-bis-(2-hydroxy-3:5-dimethyl-phenyl) alkane is incorporated into natural rubber.

3. A rubber selected from the group consisting of natural and synthetic rubbers obtained by polymerizing diolefinic compound containing a material selected from the group consisting of the normal and basic aluminum, barium, calcium magnesium, strontium and zinc salts of $\alpha\alpha$-bis-(2-hydroxy-3:5-dialkyl-phenyl) alkanes.

4. A rubber according to claim 3 wherein said material is the zinc salt of bis-(2-hydroxy-5-methyl-3-tert.-butylphenyl) methane.

5. A rubber according to claim 3 wherein said material is the magnesium salt of bis-(2-hydroxy-5-methyl-3-tert.-butylphenyl) methane.

6. A rubber according to claim 3 wherein said material is the magnesium salt of bis-(2-hydroxy-5-methyl-3-tert.-amylphenyl) methane.

7. A rubber according to claim 3 wherein said material is the calcium salt of bis-(2-hydroxy-3:5-dimethylphenyl) methane.

8. A rubber according to claim 3 wherein said material is the magnesium salt of $\alpha,\alpha$-bis-(2-hydroxy-3:5-dimethylphenyl) butane.

References Cited in the file of this patent
UNITED STATES PATENTS

| 2,295,985 | Baird et al. | Sept. 15, 1942 |
| 2,354,013 | Gump | July 18, 1944 |
| 2,538,355 | Davis et al. | Jan. 16, 1951 |
| 2,647,873 | Matthews et al. | Aug. 4, 1953 |